United States Patent
Shih

(10) Patent No.: US 10,114,429 B1
(45) Date of Patent: Oct. 30, 2018

(54) DATA STORAGE DEVICE SECURING MECHANISM

(71) Applicant: HONGFUJIN PRECISION ELECTRONICS (TIANJIN) CO., LTD., Tianjin (CN)

(72) Inventor: Tung-Ho Shih, New Taipei (TW)

(73) Assignee: HONGFUJIN PRECISION ELECTRONICS (TIANJIN) C, Tianjin (CN)

( * ) Notice: Subject to any disclaimer, the term of this patent is extended or adjusted under 35 U.S.C. 154(b) by 0 days.

(21) Appl. No.: 15/615,302

(22) Filed: Jun. 6, 2017

(30) Foreign Application Priority Data

Apr. 25, 2017 (CN) .......................... 2017 1 0276514

(51) Int. Cl.
*G06F 1/16* (2006.01)
*G06F 1/18* (2006.01)
*B65D 25/10* (2006.01)
*H05K 7/14* (2006.01)

(52) U.S. Cl.
CPC .......... *G06F 1/187* (2013.01); *B65D 25/108* (2013.01); *H05K 7/1418* (2013.01)

(58) Field of Classification Search
CPC ..................................................... G06F 1/187
USPC .................................................. 361/679.33
See application file for complete search history.

(56) References Cited

U.S. PATENT DOCUMENTS

| | | | | |
|---|---|---|---|---|
| 5,332,306 A * | 7/1994 | Babb | .................... | H05K 7/1405 312/223.1 |
| 5,751,551 A * | 5/1998 | Hileman | ................ | G11B 33/08 248/634 |
| 6,616,106 B1 * | 9/2003 | Dean | ........................ | G06F 1/184 248/27.1 |
| 6,619,766 B1 * | 9/2003 | Mansueto | ............... | G06F 1/184 312/223.1 |
| 6,940,727 B2 * | 9/2005 | Dobbs | .................. | H05K 7/1418 29/831 |
| 6,956,737 B2 * | 10/2005 | Chen | ........................ | G06F 1/184 312/223.1 |
| 7,102,885 B2 * | 9/2006 | Chen | ........................ | G06F 1/184 361/679.31 |
| 7,137,767 B2 * | 11/2006 | Franke | .................. | F16F 1/3732 411/401 |
| 7,345,237 B2 * | 3/2008 | Chen | ........................ | G06F 1/187 174/50 |
| 7,369,402 B2 * | 5/2008 | Huang | .................... | G11B 33/08 312/223.1 |
| 7,477,512 B2 * | 1/2009 | Sung | ..................... | G11B 33/123 361/679.33 |
| 7,639,490 B2 * | 12/2009 | Qin | ........................ | G06F 1/187 361/679.34 |

(Continued)

*Primary Examiner* — Adrian S Wilson
(74) *Attorney, Agent, or Firm* — ScienBiziP, P.C.

(57) ABSTRACT

A data storage device securing mechanism to secure at least one data storage device on a board includes a bottom plate, two side plates connected with two sides of the bottom plate, and a plurality of resilient members mounted on each side plate. Each side plate defines a plurality of receiving grooves, a plurality of fasteners is configured to pass through the receiving grooves to be inserted into the data storage device to install the data storage device slidably in the securing mechanism. The resilient member is elastically deformed to abut against the fasteners to prevent the fasteners and the data storage from sliding along the receiving groove.

20 Claims, 4 Drawing Sheets

(56) References Cited

U.S. PATENT DOCUMENTS

| | | | | |
|---|---|---|---|---|
| 7,830,656 B2* | 11/2010 | Ding | G06F 1/187 | 361/679.37 |
| 7,911,777 B2* | 3/2011 | Fan | G06F 1/187 | 312/223.1 |
| 7,916,465 B2* | 3/2011 | Chen | G06F 1/187 | 361/679.31 |
| 8,041,449 B2* | 10/2011 | Noble | G11B 17/225 | 360/71 |
| 8,061,535 B2* | 11/2011 | Cheng-Yuan | G11B 33/127 | 211/26 |
| 8,213,172 B2* | 7/2012 | Sun | G06F 1/16 | 361/679.33 |
| 8,289,691 B2* | 10/2012 | Peng | G11B 33/127 | 248/27.3 |
| 8,456,831 B1* | 6/2013 | Pang | G06F 1/187 | 248/221.11 |
| 8,593,803 B2* | 11/2013 | Guo | G06F 1/187 | 174/138 E |
| 8,749,966 B1* | 6/2014 | Boudreau | G06F 1/187 | 361/679.33 |
| 8,941,983 B2* | 1/2015 | Lung | G06F 1/187 | 361/679.39 |
| 2003/0174464 A1* | 9/2003 | Funawatari | G11B 25/043 | 361/679.36 |
| 2003/0222555 A1* | 12/2003 | Mansueto | G06F 1/184 | 312/330.1 |
| 2004/0070929 A1* | 4/2004 | Lin | G06F 1/184 | 361/679.35 |
| 2004/0075978 A1* | 4/2004 | Chen | G06F 1/184 | 361/679.33 |
| 2004/0228073 A1* | 11/2004 | Chuang | G11B 33/08 | 361/679.35 |
| 2005/0040306 A1* | 2/2005 | Chen | G11B 33/128 | 248/298.1 |
| 2006/0227502 A1* | 10/2006 | Cheng | G06F 1/184 | 361/679.33 |
| 2007/0019377 A1* | 1/2007 | Chen | G06F 1/187 | 361/679.31 |
| 2008/0007908 A1* | 1/2008 | Chen | G06F 1/187 | 361/679.34 |
| 2008/0291619 A1* | 11/2008 | Fan | G06F 1/187 | 361/679.37 |
| 2009/0073651 A1* | 3/2009 | Hu | G06F 1/184 | 361/679.58 |
| 2009/0091882 A1* | 4/2009 | Liu | G06F 1/187 | 361/679.33 |
| 2009/0189042 A1* | 7/2009 | Chen | G06F 1/187 | 248/309.1 |
| 2009/0212182 A1* | 8/2009 | Ding | G06F 1/187 | 248/225.11 |
| 2011/0064536 A1* | 3/2011 | Chen | G06F 1/183 | 411/84 |
| 2011/0255235 A1* | 10/2011 | Chen | G06F 1/187 | 361/679.33 |
| 2011/0255243 A1* | 10/2011 | Wang | G06F 1/187 | 361/679.58 |
| 2013/0105568 A1* | 5/2013 | Jablonski | G06F 19/3456 | 235/375 |

* cited by examiner

DATA STORAGE DEVICE SECURING MECHANISM

CROSS-REFERENCE TO RELATED APPLICATIONS

This application claims priority to Chinese Patent Application No. 201710276514.3 filed on Apr. 25, 2017 the contents of which, are incorporated by reference herein.

FIELD

The subject matter herein generally relates to a component securing mechanism.

BACKGROUND

The data storage device, such as optical disk driver, is an important component of the computer. A data storage device securing mechanism can be used in the computer to secure the data storage device. However, when the barcode information of each data storage needs to be read, it is necessary to remove the data storage device.

BRIEF DESCRIPTION OF THE DRAWINGS

Implementations of the present disclosure will now be described, by way of example only, with reference to the attached figures.

DETAILED DESCRIPTION

Figure 1:
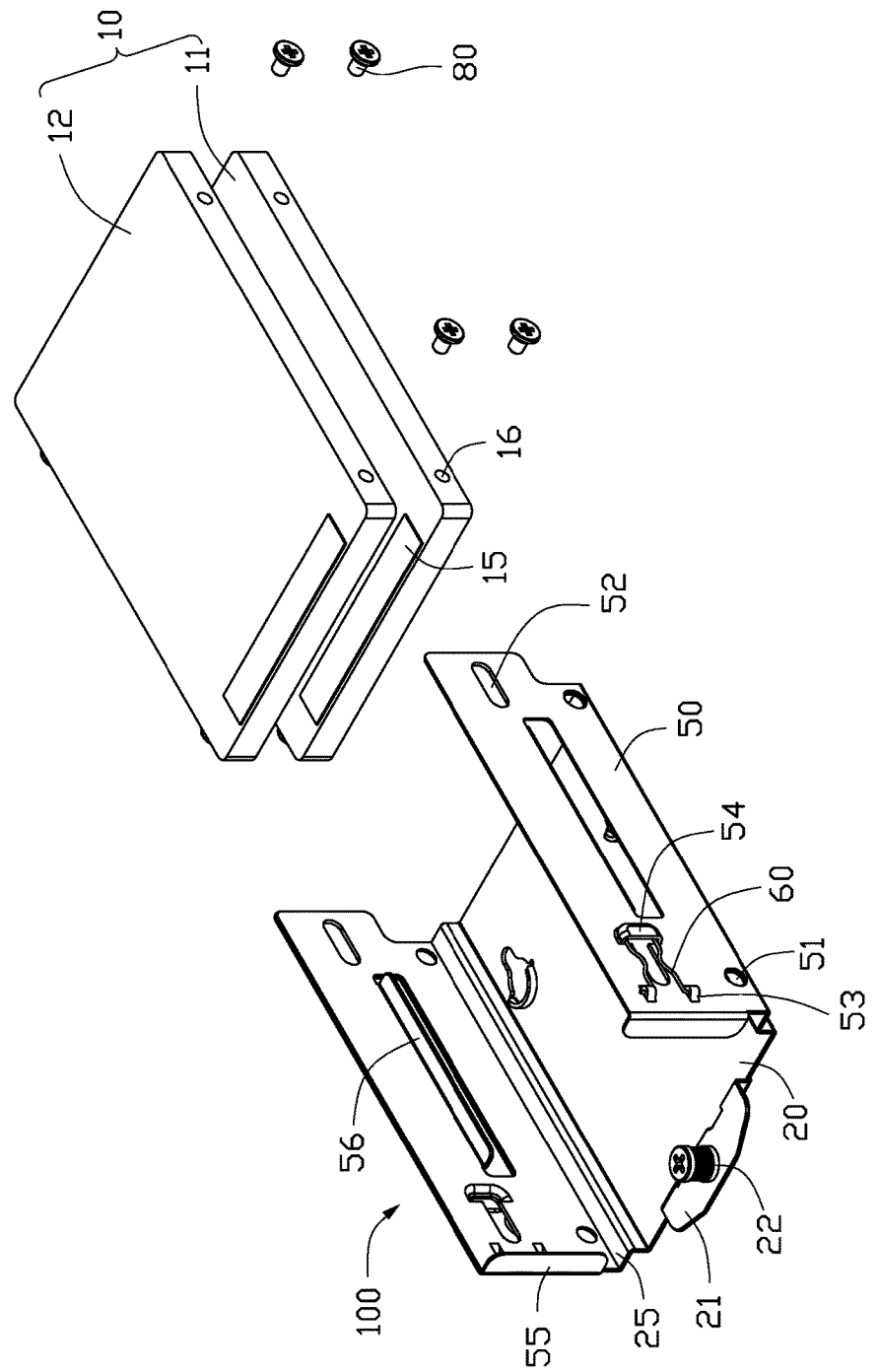
FIG. 1 is an exploded view of an exemplary embodiment of a data storage device securing mechanism and two data storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "outside" refers to a region that is beyond the outermost confines of a physical object. The term "inside" indicates that at least a portion of an object is contained within a boundary formed by another object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 illustrates one exemplary embodiment of a data storage device securing mechanism 100 configured to secure at least one data storage device 10. The data storage device securing mechanism 100 includes a bottom plate 20 and two side plates 50 connected with two sides of the bottom plate 20.

A front end of the data storage device 10 includes a barcode 15, and the barcode 15 is configured to record information of the data storage device 10. Two sides of the data storage device 10 respectively define two mounting holes 16. In at least one exemplary embodiment, the data storage device securing mechanism 100 is configured to secure two data storage devices 10. Two data storage devices 10 include a first data storage device 11 and a second data storage device 12.

A front end of the bottom plate 20 includes a stopper plate 21, the stopper plate 21 is configured to abut against the front end of the data storage device 10 to prevent the data storage device 10 from moving to the direction of the stopper plate 21. A limiting member 22 can pass through the stopper plate 21 to secure the data storage device securing mechanism 100 on a chassis (not shown in FIGS). Two sides of the bottom plate 20 include a sliding plate 25, and the data storage device 10 can be slid along the sliding plate 25.

The two side plates 50 are parallel to each other and are perpendicularly connected to the sliding plate 25. Both ends of each side plate 50 defines a positioning hole 51 corresponding to the mounting hole 16 at a bottom end of the side plate 50, and a plurality of fasteners 80 can pass through the positioning holes 51 and the mounting holes 16 of the data storage device 10 to secure the data storage device 10.

The ends of each side plate 50 each define a receiving groove 52 corresponding to the mounting hole 16 at a top end of the side plate 50, and the fastener 80 can pass through the receiving groove 52 and the mounting hole 16 to secure the data storage device 10. The fastener 80 can be slid in the receiving groove 52 to drive the data storage device 10 to slide along the side plate 50.

A limiting plate 55 is connected with a front end of each side plate 50, and the limiting plate 55 abuts against the front end of the data storage device 10 to prevent the data storage device 10 from sliding to the direction of the limiting plate 55. A middle portion of each side plate 50 includes a supporting plate 56 parallel to the sliding plate 25, and the data storage device 10 can slide along the supporting plate 56.

Figure 2:
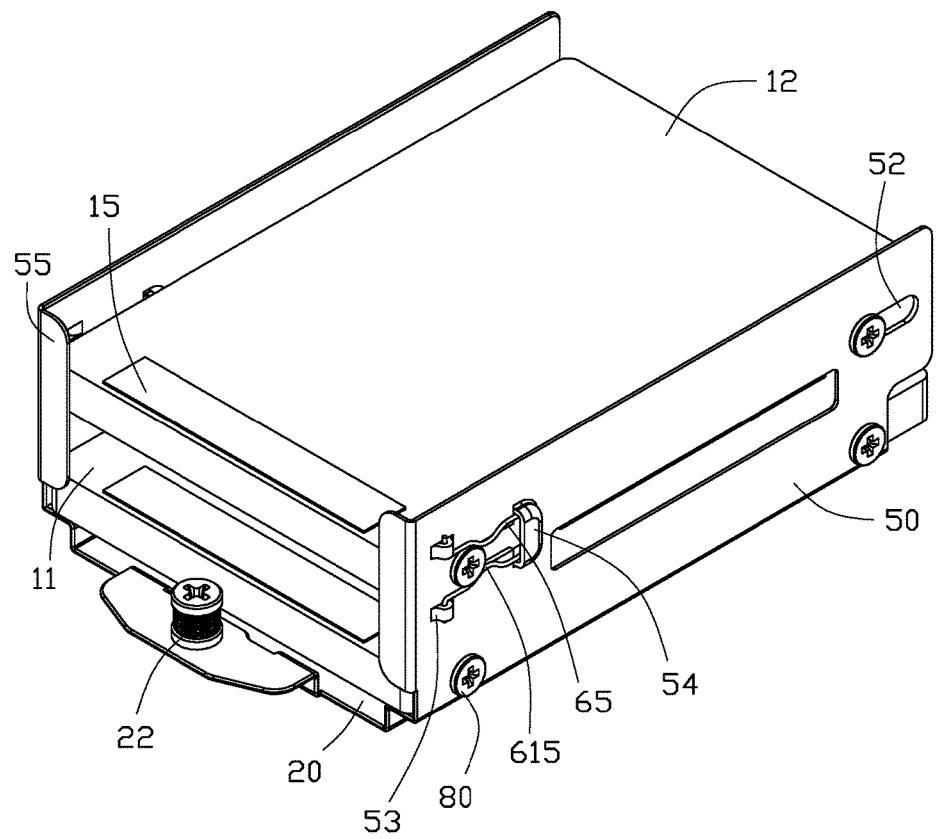
FIG. 2 is an assembled view of the data storage device securing mechanism and the two data storage devices.
Figure 3:
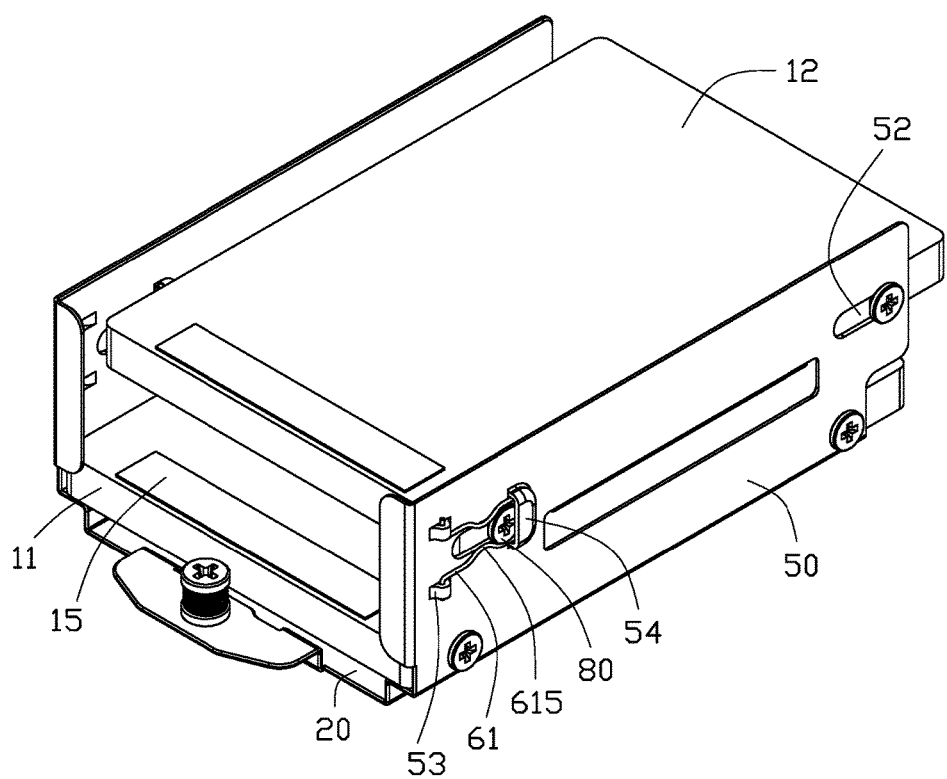
FIG. 3 is similar to FIG. 2, but the second data storage device is displaced to expose the barcode of the first data storage device.

FIG. 2 and FIG. 3 illustrate that the side plate 50 is provided with a positioning column 53 at the top end and the bottom end of the receiving groove 53, and the side plate 50 is provided with a receiving cover 54 at the rear end of the receiving groove 52. A resilient member 60 includes two resilient arms 61 and a connecting member 65 connected to the two resilient arms 61. The two resilient arms 61 are relatively compressed so that the ends of each resilient arm 61 are inserted into the positioning columns 53, and the connecting members 65 are received in the receiving cover 54. Each resilient arm 61 is provided with a facing latch portion 615, and the latch portion 615 can be engaged with the fastener 80 to prevent the fastener 80 from sliding.

FIG. 2 illustrates assembly of the data storage device securing mechanism 100. The connecting member 65 is received in the receiving cover 54, and the two resilient arms 61 are relatively compressed to be inserted into the positioning columns 53. The first data storage 11 is slid along the sliding plate 25 to be slidably installed on the data storage device securing mechanism 100. The mounting holes 16 of both sides of the data storage 10 are aligned with the positioning holes 51 of the side plates 50. The first fasteners 80 pass through the positioning holes 51 and the mounting holes 16 to secure the first data storage 11 on the data storage device securing mechanism 100.

The second data storage 12 is slid along the supporting plate 56 to be installed on the data storage device securing mechanism 100. The mounting holes 16 of the second data storage 12 are aligned with the receiving grooves 52, and the second fasteners 80 pass through the receiving grooves 52 and the mounting holes 16 to secure the second data storage 12 on the data storage device securing mechanism 100. The second data storage 12 is pushed forward, and the fasteners 80 slide along the receiving groove 52 and press against the latch portions 615 of the two resilient arms 61. The latch portions 615 are elastically deformed to let the fasteners 80 pass through and can elastically recover to secure the fasteners 80, thereby preventing the second data storage 12 from sliding backwards and forwards.

Figure 4:
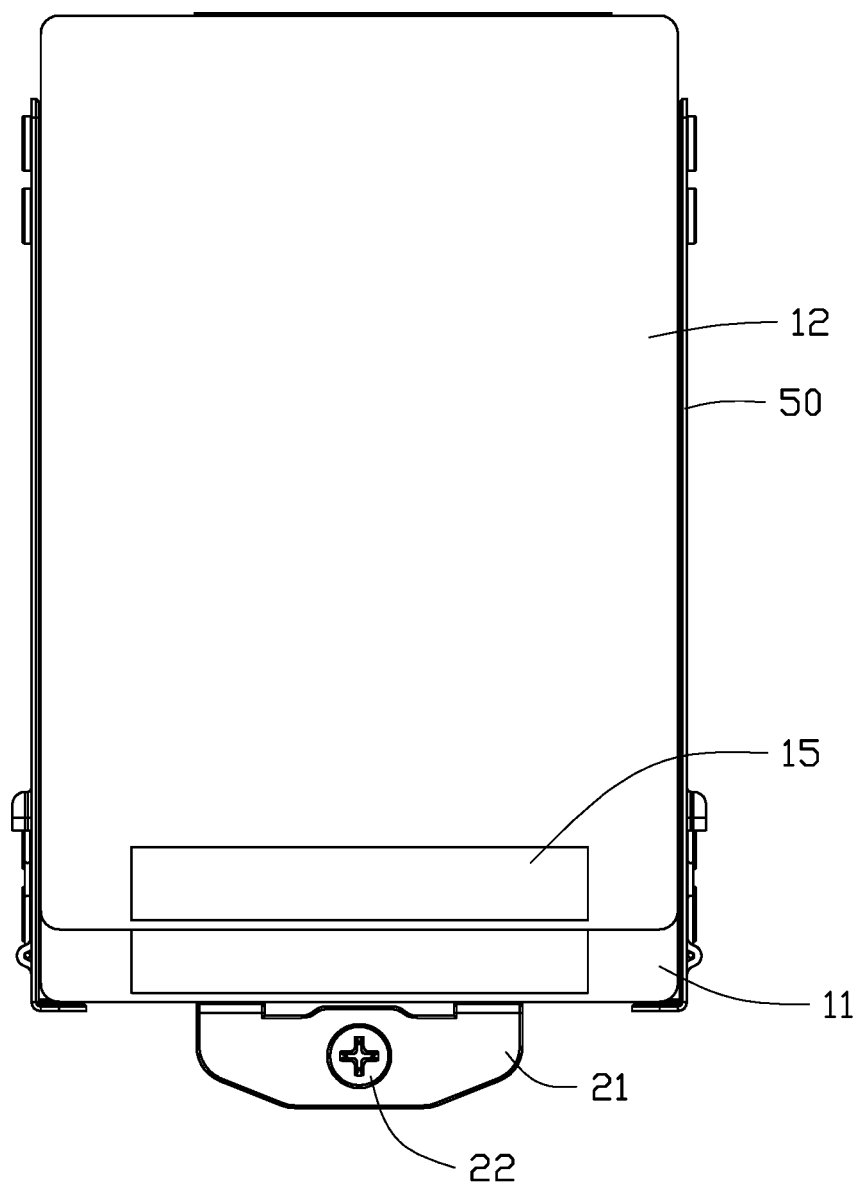
FIG. 4 is an assembled, top view of the data storage device securing mechanism and the two data storage devices of FIG. 3.

Referring to FIGS. 3 and 4, when the barcode 15 information is at the front end of the first data storage 11 and the front end of the second data storage 12, the second data storage 12 is pulled backward, the second fasteners 80 slide along the receiving groove 52 and press against the latch portions 615 of the two resilient arms 61. The latch portions 615 are elastically deformed to let the fasteners 80 pass through until the fasteners 80 are received in the receiving cover 54. The latch portions 615 elastically recover to secure the fasteners 80. At this time, the second data storage 12 slides backwards for a distance and exposes the barcode 15 of the first data storage 11. The information of the first data storage 11 and the second data storage 12 can thus be conveniently viewed at the same time.

The exemplary embodiments shown and described above are only examples. Many details are often found in the art such as the other features of data storage device securing mechanism. Therefore, many such details are neither shown nor described. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A data storage device securing mechanism securing at least one data storage, comprising:
    a bottom plate;
    two side plates connected to two sides of the bottom plate; and
    a plurality of resilient members mounted on each side plate, each resilient member having a plurality of ends;
    wherein each side plate defines a plurality of receiving grooves, a plurality of fasteners is configured to pass through the receiving grooves to be inserted into the data storage to slidably install the data storage in the data storage device securing mechanism, the resilient member is elastically deformed to abut against the fasteners to prevent the fasteners and the data storage from sliding along the receiving groove;
    when the data storage slides in the data storage device securing mechanism, the ends of the resilient member remain fixed to the side plate.

2. The data storage device securing mechanism of claim 1, wherein each side plate comprises a receiving cover close to a rear end of the receiving groove, the resilient member comprises a connecting member, and the connecting member is received in the receiving cover.

3. The data storage device securing mechanism of claim 2, wherein each side plate comprises two positioning column closes to a front end of the receiving groove, the resilient member comprises two resilient arms connected with both ends of the connecting member, the resilient arms are relatively compressed and the ends of each resilient arm are inserted into the corresponding positioning columns.

4. The data storage device securing mechanism of claim 3, wherein each resilient arm defines a latch portion, and the latch portion abuts against the fastener to prevent the fastener from sliding.

5. The data storage device securing mechanism of claim 4, wherein each side plate define a plurality of positioning holes, the fasteners pass through the positioning holes and the data storage to secure the data storage.

6. The data storage device securing mechanism of claim 1, wherein each side plate comprises a supporting plate, and the data storage is slid along the supporting plate to be slidably installed on the data storage device securing mechanism.

7. The data storage device securing mechanism of claim 1, wherein a front end of each side plate comprises a limiting plate, and the limiting plate abuts against a front end of the data storage to prevent the data storage from sliding.

8. The data storage device securing mechanism of claim 1, wherein a front end of the bottom plate comprises a stopper plate, and the stopper plate abuts against a front end of the data storage to prevent the data storage from sliding.

9. The data storage device securing mechanism of claim 1, wherein both sides of the data storage define a plurality of mounting holes, the fasteners pass through the mounting holes to be inserted into the data storage to secure the data storage on the data storage device securing mechanism.

10. The data storage device securing mechanism of claim 1, wherein one end of the data storage comprises a barcode, and the barcode records the information of the data storage device.

11. A data storage device combination, comprising:
    at least one data storage; and
    a data storage device securing mechanism comprising:
        a bottom plate;
        two side plates connected to two sides of the bottom plate; and
        a plurality of resilient members mounted on each side plate, each resilient member having a plurality of ends;
    wherein each side plate defines a plurality of receiving grooves, a plurality of fasteners is configured to pass through the receiving grooves to be inserted into the data storage to slidably install the data storage in the data storage device securing mechanism, the resilient member is elastically deformed to abut against the fasteners to prevent the fasteners and the data storage from sliding along the receiving groove;

when the data storage slides in the data storage device securing mechanism, the ends of the resilient member remain fixed to the side plate.

12. The data storage device combination of claim 11, wherein each side plate comprises a receiving cover close to a rear end of the receiving groove, the resilient member comprises a connecting member, and the connecting member is received in the receiving cover.

13. The data storage device combination of claim 12, wherein each side plate comprises two positioning column closes to a front end of the receiving groove, the resilient member comprises two resilient arms connected with both ends of the connecting member, the resilient arms are relatively compressed and the ends of each resilient arm are inserted into the corresponding positioning columns.

14. The data storage device combination of claim 13, wherein each resilient arm defines a latch portion, and the latch portion abuts against the fastener to prevent the fastener from sliding.

15. The data storage device combination of claim 11, wherein each side plate define a plurality of positioning holes, the fasteners pass through the positioning holes and the data storage to secure the data storage.

16. The data storage device combination of claim 11, wherein each side plate comprises a supporting plate, and the data storage is slid along the supporting plate to be slidably installed on the data storage device securing mechanism.

17. The data storage device combination of claim 11, wherein a front end of each side plate comprises a limiting plate, and the limiting plate abuts against a front end of the data storage to prevent the data storage from sliding.

18. The data storage device combination of claim 11, wherein a front end of the bottom plate comprises a stopper plate, and the stopper plate abuts against a front end of the data storage to prevent the data storage from sliding.

19. The data storage device combination of claim 11, wherein both sides of the data storage define a plurality of mounting holes, the fasteners pass through the mounting holes to be inserted into the data storage to secure the data storage on the data storage device securing mechanism.

20. The data storage device combination of claim 11, wherein one end of the data storage comprises a barcode, and the barcode records the information of the data storage device.

* * * * *